United States Patent [19]

Takamiya et al.

[11] Patent Number: 4,934,205
[45] Date of Patent: Jun. 19, 1990

[54] STEPLESS SPEED CHANGE DEVICE

[75] Inventors: Kikuzo Takamiya, Kitamoto; Yoshitaka Tamura, Kitasaitama; Kiyofumi Hirai, Ageo, all of Japan

[73] Assignee: Bridgestone Cycle Co., Ltd., Japan

[21] Appl. No.: 284,407

[22] Filed: Dec. 14, 1988

[30] Foreign Application Priority Data

Nov. 1, 1988 [JP] Japan ................................. 63-27457

[51] Int. Cl.$^5$ ............................................. F16H 15/14
[52] U.S. Cl. ......................................... 74/199; 74/190
[58] Field of Search ................. 74/199, 209, 212, 200, 74/211, 190

[56] References Cited

U.S. PATENT DOCUMENTS

| 2,794,346 | 6/1957 | Frost | 74/199 |
| 3,202,003 | 8/1965 | Heintz | 74/199 |
| 3,765,257 | 10/1973 | Ogino | 74/199 |
| 3,990,328 | 11/1976 | Galbraith | 74/199 X |

FOREIGN PATENT DOCUMENTS

| 683199 | 3/1964 | Canada | 74/190 |
| 592675 | 5/1959 | Italy | 74/199 |
| 46-34919 | 12/1971 | Japan . | |
| 46-42249 | 12/1971 | Japan . | |
| 49-29168 | 8/1974 | Japan . | |
| 653280 | 5/1951 | United Kingdom | 74/199 |

Primary Examiner—James R. Brittain
Attorney, Agent, or Firm—Arnold, White & Durkee

[57] ABSTRACT

The invention relates to a stepless speed change device which comprises: an input shaft and an output shaft concentric to each other, a disc progressively thinner toward its outer periphery and fixed to the input shaft, a hollow cylinder fixed to the output shaft for enclosing the disc, a ring progressively thinner toward its inner periphery opposite to that of the disc and fixed to an inner circumference of the hollow cylinder in the same plane as that of the disc, and an intermediate transmitting device having two discs for embracing the ring and the disc on both sides thereof and being movable from a concentric position with the input and output shafts to eccentric positions with desired eccentricities therefrom in a stepless manner. With the above arrangement, the input shaft may be used as an output shaft, and the output shaft may be used as an input shaft.

10 Claims, 6 Drawing Sheets

FIG. 1

FIG_2

FIG_3

FIG. 6

FIG_7

STEPLESS SPEED CHANGE DEVICE

BACKGROUND OF THE INVENTION

This invention relates to a stepless speed change device for a general purpose of being suitable for use in industrial machines, transportation facilities and the like.

There are various systems of stepless speed change devices. The friction stepless speed change devices concerning with the invention are classified into cone, disc, ring and spherical surface transmissions.

With any of the friction stepless speed change devices above described, the stepless speed change transmission is effected by changing rotating radii of the friction transmission contacting points in a stepless manner. The friction transmission contacting points are divided into two kinds of external and internal contacting types.

The external contacting types are disclosed for example, in Japanese Utility Model Application Publication No. 49-29,168 and Japanese Patent Application Publication No. 46-42,249. The internal contacting type is disclosed, for example, in Japanese Utility Model Application Publication No. 46-34,919.

In the external contacting type, the transmission is accomplished by contact between two convex surfaces, whose contacting surfaces are wide, belt-like surfaces along contacting orbits corresponding to pitch lines due to contacting pressures. As a result, positive and negative slips occur on outer and inner sides of the contacting orbit so that such slips result in internal friction losses which lower the transmission efficiency.

Moreover, the case of which either the driving or driven sides has a small curvature rotor, when the difference in rotating radii of the driving and driven sides becomes large, the above positive and negative slips further rapidly increase. As a result, the transmission efficiency is further lowered.

Therefore, the stepless speed exchange device of the external contacting type has a disadvantage in that the transmission efficiency is low due to the external contact.

On the other hand, with the device of the internal contacting type, the transmission is effected by contact between a concave surface and a convex surface. Contacting orbits are narrow, line-shaped surfaces. Therefore, the device of the internal contacting type is superior, having less internal friction losses and high transmission efficiency, to the device of the external contacting type.

With the device of the internal contacting type, however, the friction discs are apt to open out of a parallel position such it is difficult to maintain the driving and driven discs in parallel with each other and the contacting pressure becomes unstable, which results in a difficult transmission of torque and a lowered transmission efficiency.

Moreover, with a device of the internal contacting type, either the input or the output shaft is movable, so that in order to support the movable shaft a rigid member is needed.

SUMMARY OF THE INVENTION

It is a primary objective of the invention to provide an improved stepless speed change device which eliminates all the disadvantages of the prior art and is high in transmission efficiency and of small size and light weight.

In order to achieve this objective, the stepless speed change device according to the invention comprises an input shaft and an output shaft concentric to each other, a disc progressively thinner toward its outer periphery and fixed to the input shaft, a hollow cylinder fixed to the output shaft for enclosing the disc, a ring progressively thinner toward its inner periphery opposite to that of the disc and fixed to an inner circumference of the hollow cylinder in the same plane as that of the disc, and intermediate transmitting means having two discs for embracing the ring and the disc on both sides thereof and being movable from a concentric position with the input and output shafts to eccentric positions with desired eccentricities therefrom in a stepless manner.

The input shaft may be used as an output shaft, and the output shaft may be used as an input shaft.

With the stepless speed change device constructed as described above according to the invention, when the intermediate transmitting means is concentric to the input and output shafts, all circumferences of the driving and driven rotors and the intermediate transmission means are in contact with each other. Moreover, when the intermediate transmission member is eccentric to the input and output shafts, two points at the inner and outer circumferences of the intermediate transmission means are in contact with the driving and driven discs and the two contacting points both being internal contacting points.

In this case, when the intermediate transmission means is eccentric to the input and output shafts, there are differences in the rotating radii between the driving rotor and the intermediate transmission means and between the driven rotor and intermediate transmitting means. Therefore, stepless transmission ratios can be obtained by controlling the eccentricity of the intermediate transmitting means in a stepless manner.

In order that the invention may be more clearly understood, the preferred embodiments will be described, by way of example, with reference to the accompanying drawings.

DESCRIPTION OF THE PREFERRED EMBODIMENT

Figure 1:
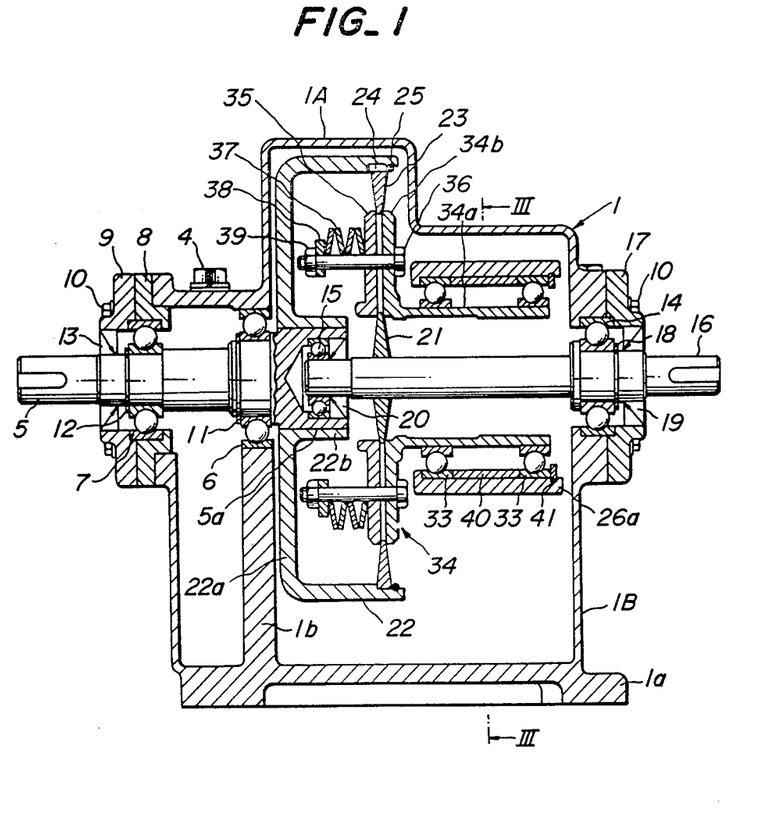
FIG. 1 is a longitudinal sectional side view of a stepless speed change device according to the invention.

Referring to FIG. 1, illustrating one embodiment of the invention, a stepless speed change device comprises a casing 1 consisting of an upper casing 1A and a lower casing 1B formed integrally with a base 1a and a partition 1b in the lower casing 1B. The lower casing 1B is provided with an oil drain plug 2 (FIG. 2) and an oil gauge 3 provided thereabove. The upper and lower casings 1A and 1B are firmly connected by bolts 4.

In this embodiment, an output shaft 5 having an inner end 5a in the form of a hollow cylinder is rotatably supported between the upper and lower casings 1A and 1B on their rear side by means of two ball bearings 6 and 7. A ring 8 enclosing the bearing 7 is fixed together with a bearing retainer 9 to the casing 1 by means of bolts 10. Snap rings 11 and 12 retain relative axial movement between the bearings 6 and 7 and the output shaft 5. An oil seal 13 closes the rear side chamber of the casing 1 in an oil-tight manner.

An input shaft 16 is rotatably supported, concentric to the output shaft 5, between the upper and lower casings 1A and 1B on their front side by means of two ball bearings 14 and 15. A front end of the input shaft 16 is supported by the ball bearing 14 which is fixed through a bearing retainer 17 to the casing 1 by means of bolts 10. Reference numeral 18 denotes a snap ring, and 19 illustrates an oil seal. A rear end of the input shaft 16 is supported by a ball bearing 15 in the inner end 5a in the form of the hollow cylinder of the output shaft 5. Reference numeral 20 denotes an oil seal.

On the input shaft in the casing 1 is fitted a disc 21 as a driving rotor which is thinner progressively toward its outer periphery. A hollow cylinder 22 having a large diameter for enclosing the disc 21 is fitted on the inner end 5a of the output shaft 5 with a disc portion 22a and a boss 22b integral with the hollow cylinder 22. A ring 23 as a driven rotor is fixed to an inner circumference of the hollow cylinder 22 in the same plane as that of the disc 21. The ring 23 is thinner progressively towards its inner periphery in an opposite direction to that of the disc 21. A pin 24 serves to prevent the disc 23 from rotating relative to the hollow cylinder 22, and a stop ring 25 serves to prevent the disc 23 from axially moving relative to the hollow cylinder 22.

Figure 2:
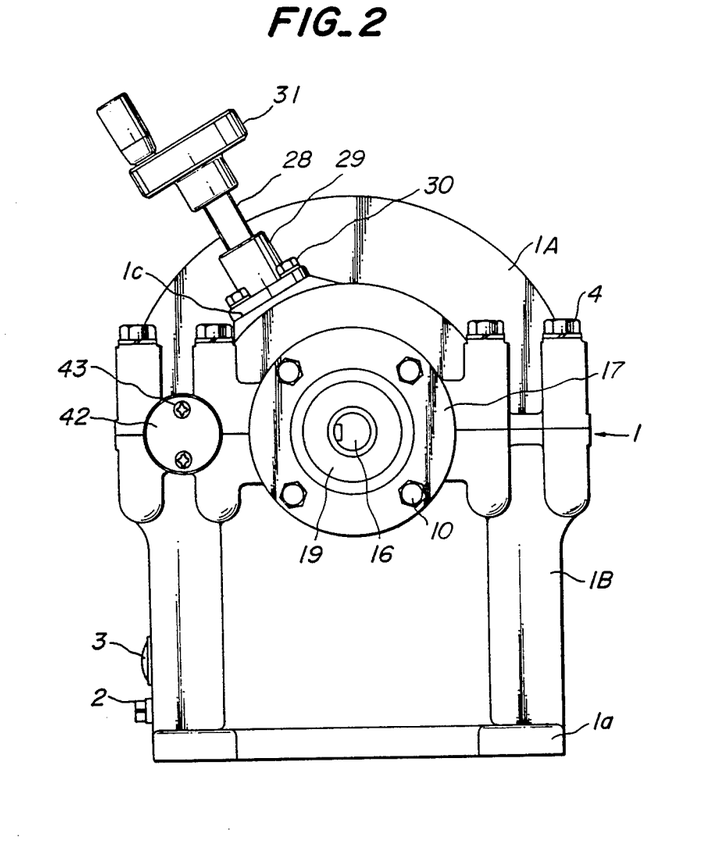
FIG. 2 is a front elevation viewed from an input side of the device shown in FIG. 1.
Figure 3:
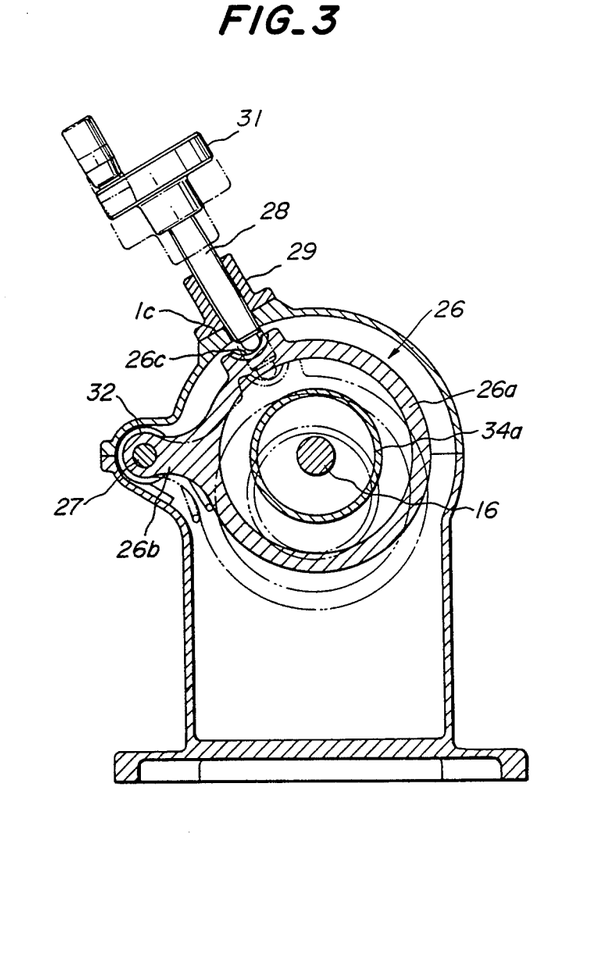
FIG. 3 is a sectional view of an eccentric portion of the device taken along the line III—III in FIG. 1.

As shown in FIG. 3, an eccentric barrel member 26a in the form of a large diameter hollow cylinder is provided about the input shaft 16. The eccentric barrel member 26a is provided with an arm 26b extending therefrom and is rockably supported on the casing 1 by a shaft 27 passing through one end of the arm 26b so as to be rockable about the shaft 27. The eccentric barrel member 26a is integrally formed at its upper portion with a concaved receiving seat 26c to form an eccentric barrel 26. A feed screw 28 is rotatably provided in the casing 1 so as to be in opposition to the receiving seat 26c. A flanged nut 29 is adapted to be threadedly engaged with the feed screw 28 and fixed to a seat face 1c of the upper casing 1A by means of bolts 30 (FIG. 2). An operating hand-wheel 31 is fixed to the feed screw 28. A torsion spring 32 is provided about the shaft 27 to constantly urge the eccentric barrel member 26a of the eccentric barrel 26 upward.

Figure 4:
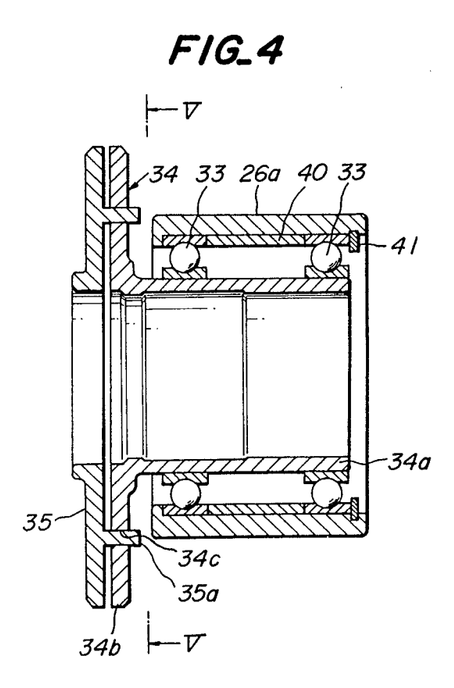
FIG. 4 is a sectional view illustrating the engaging condition of the eccentric portion and intermediate transmitting means of the device shown in FIG. 1.

As shown in FIGS. 1 and 4, a hollow cylinder 34a is rotatably supported in the eccentric barrel member 26a by two ball bearings 33 and is integrally formed with a flange-like disc 34b to form an intermediate transmitting member 34 on one side. In opposition to the disc 34b is provided a disc 35 to form an intermediate transmitting member 35 on the other side. These two discs 34b and 35 embrace the ring 23 and the disc 21 on both sides.

Figure 5:
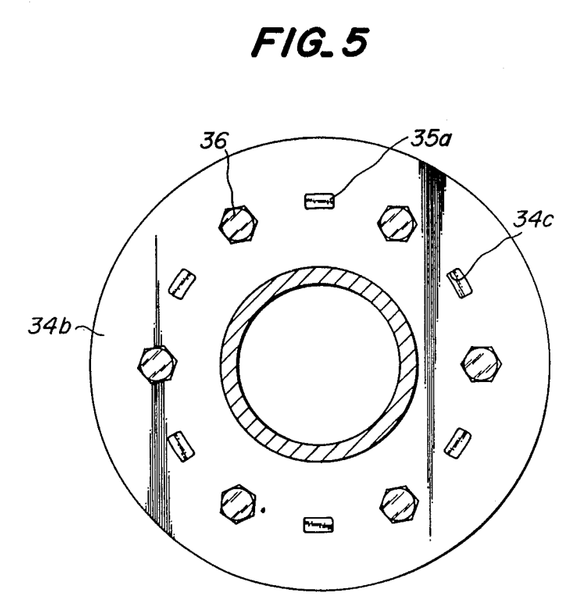
FIG. 5 is a sectional view of the intermediate transmitting means taken along the line V—V in FIG. 4.

The disc 34b is formed with six positioning apertures 34c in a circle and the disc 35 is formed with six positioning protrusions adapted to be fitted with the positioning apertures 34c (FIGS. 4 and 5). Six pressure adjusting bolts 36 pass through the discs 34b and 35. Four dish-shaped springs 37 are fitted on the bolts 36 extending from the disc 35. Ring plates 38 are fitted on the bolts 36 for preventing the dish-shaped springs 37 from dislodging in conjunction with nuts 39 threadedly engaging the bolts 36.

In FIGS. 1 and 4, a collar 40 is interposed between the bearings 33 and retained by a snap ring 41. A bearing cover 42 is fixed to the casing by set screws 43 (FIG. 2).

In the above embodiment, the shafts 16 and 5 have been explained as the input and output shafts, respectively. However, the shaft 5 may be an input shaft and the shaft 16 may be an output shaft.

In a second aspect of the invention, the shaft 5 is an input shaft and the shaft 16 is an output shaft. The other embodiment of this case is the same as that of the first embodiment, so that it will not be explained in more detail.

The operation of the device according to the invention will be explained hereinafter.

The solid lines in FIGS. 1 and 3 illustrate a case in which the eccentric barrel 26 is concentric to or in alignment with the input and output shafts 16 and 5. In this condition, a leading end of the feed screw 28 abuts against the receiving seat 26c of the eccentric barrel 26. When the operating hand-wheel 31 is rotated into this position to extend the feed screw 28, the eccentric barrel 26 is rotated downward about the shaft 27 into an eccentric position, shown as two dots and dash lines. In contrast herewith, upon retracting the feed screw 28, the eccentric barrel 26 is returned to the original position with the aid of a force of the torsion spring 32.

In other words, by rotating the operating hand-wheel 31, the eccentric barrel 26 can be rotated from its on concentric position to eccentric position in any eccentric amount relative to the shafts 16 and 5.

In the concentric position shown in FIG. 1, the intermediate transmitting members 34 and 35 are concentric to the disc 21 as the driving rotor and the ring 23 as the driven rotor. The disc 21 and the ring 23 are in contact with the discs of the intermediate transmitting members 34 and 35 at points along the entire circumferences. Therefore, when the driving rotor 21 is rotated, the driven rotor 23 is rotated through the intermediate transmitting members 34 and 35 in unison and without slipping.

In this case, therefore, the stepless speed change device according to the present invention becomes a directly driving coupling or joint whose rotating ratio is 1:1.

Figure 6:
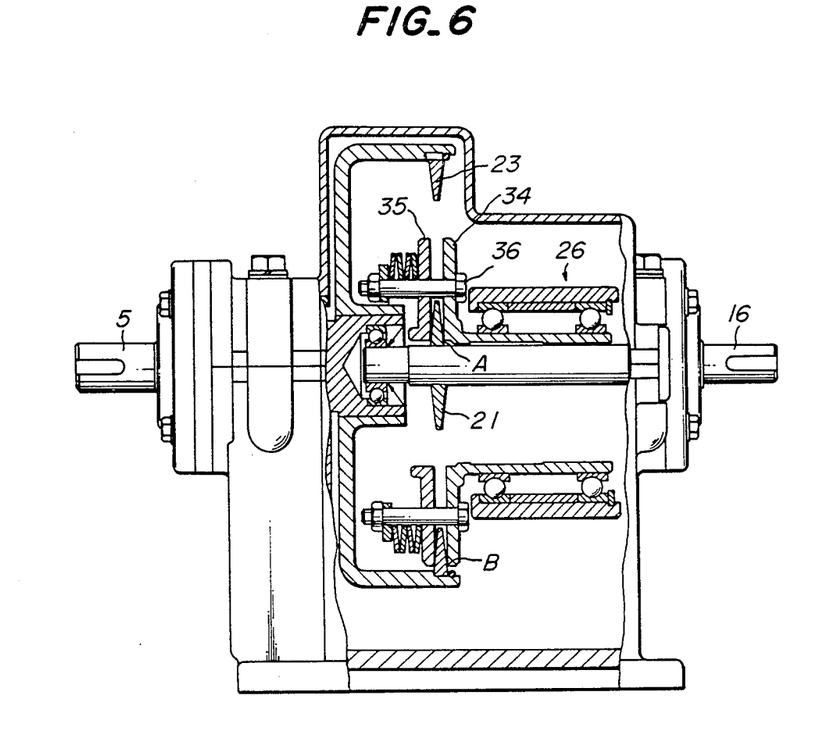
FIG. 6 is a sectional view of the device shown in FIG. 1 in the maximum eccentric condition.
Figure 7:
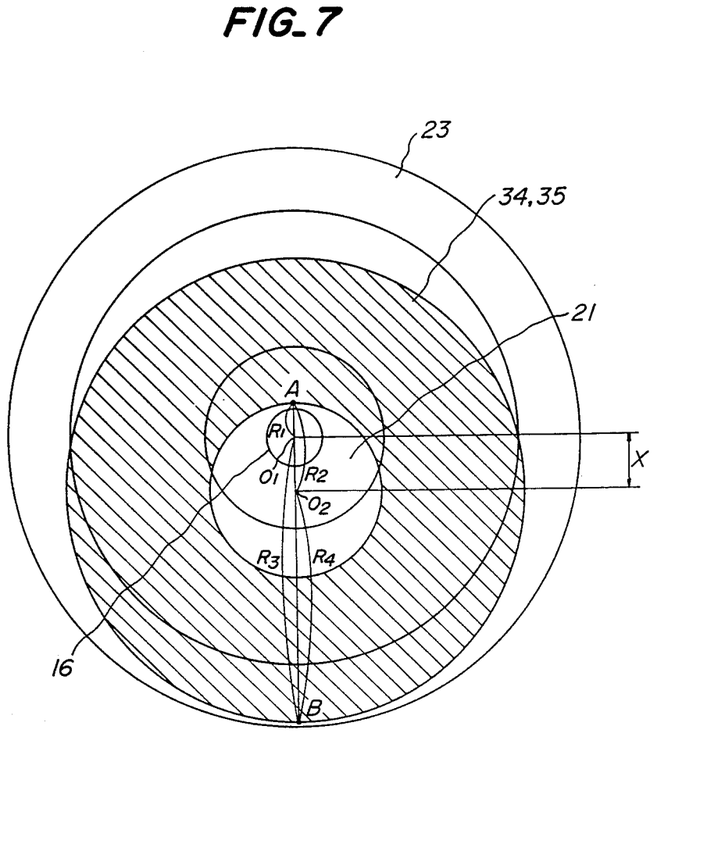
FIG. 7 is a front elevation illustrating the relation of the intermediate transmitting means relative to the driving and driven rotors of the device.

In the eccentric position shown in FIGS. 6 and 7, contacting portions between the driving rotor 21 and the intermediate transmitting members 34 and 35 lie in the proximity of a point A, and contacting portions between the driven rotor 23 and the intermediate transmitting members 34 and 35 lie in the proximity of a point B.

When the input shaft 16 is rotated in this condition, rotating radii of the driving rotor 21 and the intermediate transmitting members 34 and 35 at the point A are different. Moreover, at the point B, rotating radii of the driven rotor 23 and the intermediate transmitting members 34 and 35 are also different.

Referring to FIG. 7, it is assumed that a center of the driving rotor 21 and the driven rotor 23 is $O_1$, and a center Of the intermediate transmitting members 34 and 35 is $O_2$, and distance between $O_1$ and A, $O_2$ and A, $O_1$ and B, and $O_2$ and B are $R_1$, $R_2$, $R_3$ and $R_4$, respectively. When the input shaft 16 is rotated, the rotating speed is reduced to $R_1/R_2$ at the point A and, further reduced to $R_4/R_3$ at the point B and transmitted to the output shaft 5.

In this embodiment, $R_1/R_2$ is 0.4 and $R_4/R_3$ is 0.8, such that the speed reduction is approximately 0.3 as a whole. In other words, by displacing the eccentric barrel 26 from the concentric position to the eccentric position by an eccentricity X as shown in FIG. 7, the device of the embodiment accomplishes the stepless transmission ratio from 1:1 to 1:0.3. In this embodiment, the device has been explained as a stepless speed reduction device. However, the device can be operated as a speed-up device by using the shaft 5 as an input shaft and the shaft 16 as an output shaft.

With such a speed-up device, it operates as a direct driving coupling of a rotating ratio 1:1, under the concentric position shown in FIG. 1. Moreover, with the eccentric condition shown in FIGS. 6 and 7, the rotating speed is increased to $R_3/R_4$ at the point B and further increased to $R_2/R_1$ at the point A. In this embodiment, $R_3/R_4$ is 1.2 and $R_2/R_1$ is 2.5 such that the speed-up with respect to points B and A, respectively, is about three times as a whole. In other words, the device accomplishes the stepless transmission ratio from 1:1 to 1:3.

As can be seen from the above explanation, both the contact points A and B of the device according to the invention are of internal contact such so that internal friction loss in the device is small in comparison with a device of external contact. Moreover, the contact point A of the driving rotor 21 with the intermediate transmitting members 34 and 35 and the contact point B of the driven rotor 23 with the intermediate transmitting members are two opposite points, different in phase by 180°. Thicknesses of the driving and driven rotors 21 and 23 at the points A and B are always equal. Therefore, the discs of the transmitting members 34 and 35 are maintained in parallel with each other so that the device is not subjected to any detrimental force. Furthermore, when the intermediate transmitting members 34 and 35 are concentric to the input and output shafts 16 and 5, the device is a shaft coupling of an entire circumference contact type.

Therefore, the stepless speed change device according to a invention can accomplish the high transmission efficiency which has never been achieved by devices of the prior art. Particularly, the device is very useful under a condition wherein the rotating ratio of 1:1 is usually needed and the stepless speed change is transitionally required.

In general, it is required that friction stepless speed change devices to produce strong compressive forces at contact portions for transmission. In connection therewith, according to the invention the driving and driven rotors 21 and 23 are embraced on both sides to cancel the forces, such that the intermediate transmitting members 34 and 35 are not required to be strongly supported.

Moreover, with the device according to the invention, even if the contacting portions between the driving and driven rotors 21 and 23, respectively, and the intermediate transmitting members 34 and 35 are moved, the respective members are maintained in parallel with each other by themselves, with the result that members for maintaining the respective members are not needed.

As the input and output shafts 16 and 5 are concentric to each other according to the invention, the input and output shafts are supported at both ends, so that the device can be small-sized and of rigid construction.

Therefore, the device according to the invention is simplified in construction as a whole and hence small-sized and of light weight.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A stepless speed change device comprising:
   an input shaft and an output shaft concentric to each other, wherein said input and output shafts function as either driving or driven means, all contact points of said driving and driven means being internal contact points, said contact points of the driving means being located in a plane which is substantially the same as a plane of said contact points of the driven means, said plane being one of substantially parallel planes of said contact points;
   a disc having a thickness which progressively decreases towards its outer periphery, said disc being fixed to said input shaft;
   a hollow cylinder fixed to said output shaft for enclosing said input shaft disc;
   a ring having a thickness which progressively decreases towards its inner periphery opposite to that of said input shaft disc, said ring being fixed to an inner circumference of said hollow cylinder in a plane which is substantially the same as that of said input shaft disc; and
   intermediate transmitting means having two discs for embracing said ring and said input shaft disc on both sides thereof and being movable from a concentric position with respect to said input and output shafts to eccentric positions with desired eccentricities therefrom in a stepless manner.

2. The stepless speed change device of claim 1, wherein one of said input and output shafts has a hollow cylinder end at one end adjacent the other of said one of said input and output shafts and one end of said other of said one of said input and output shafts is supported in the hollow cylinder end of said one of said input and output shafts.

3. The stepless speed change device of claim 2, wherein said hollow cylinder is fitted onto said hollow cylinder end of the other of said input and output shafts.

4. The stepless speed change device of claim 1, wherein said intermediate transmitting means comprises:
   an eccentric barrel member in the form of a large diameter, hollow cylinder provided about one of said input and output shafts and rockably connected to a casing of the device;
   means provided on the casing for rockably moving said eccentric barrel member into an eccentric position; and
   urging means for returning said eccentric barrel member from the eccentric position to an original position.

5. The stepless speed change device of claim 4, wherein said means for rockably moving said eccentric barrel member comprises a feed screw which is rotatively driven externally of the casing and is driven into the casing to rockably move said eccentric barrel member, said urging means comprising a torsion spring which urges said eccentric barrel member normally, to return said eccentric barrel member to the original position.

6. The stepless speed change device of claim 4, wherein one of said discs of said intermediate transmitting means is concentrically provided with a hollow cylinder rotatably supported in said eccentric barrel, either of said discs of said intermediate transmitting means is formed with positioning apertures, and the other of said one of said discs of said intermediate transmitting means is formed with positioning protrusions to be fitted into said positioning apertures, and springs are provided to constantly urge said discs of said intermediate transmitting means toward each other.

7. The stepless speed change device of claim 6, wherein said springs are dish-shaped springs.

8. A stepless speed change device comprising:
   an input shaft and an output shaft concentric to each other wherein said input and output shafts function as either driving or driven means, all contact points of said driving and driven means being internal contact points, said contact points of the driving means being located in a plane which is substantially the same as a plane of said contact points of the driven means, said plane being one of substantially parallel planes of said contact points;
   a disc having a thickness which progressively decreases towards its outer periphery, said disc being fixed to said output shaft;
   a hollow cylinder fixed to said input shaft for enclosing said output shaft disc;
   a ring having a thickness which progressively decreases toward its inner periphery opposite to that of said output shaft disc, said ring being fixed to an inner circumference of said hollow cylinder in a plane which is substantially the same as that of said output shaft disc; and
   intermediate transmitting means having two discs for embracing said ring and said output shaft disc on both sides thereof and being movable from a concentric position with respect to said input and output shafts to eccentric positions with desired eccentricities therefrom in a stepless manner.

9. The stepless speed change device of claim 8, wherein one of said input and output shafts has a hollow cylinder end at one end adjacent the other of said one of said input and output shafts and one end of said other of said one of said input and output shafts is supported in the hollow cylinder end of said one of said input and output shafts.

10. The stepless speed change device of claim 8, wherein said intermediate transmitting means comprises:
   an eccentric barrel member in the form of a large diameter, hollow cylinder provided about one of said input and output shafts and rockably connected to a casing of the device;
   means provided on the casing for rockably moving said eccentric barrel member into an eccentric position; and
   urging means for returning said eccentric barrel member from the eccentric position to an original position.

* * * * *

UNITED STATES PATENT AND TRADEMARK OFFICE
CERTIFICATE OF CORRECTION

PATENT NO. : 4,934,205
DATED : June 19, 1990
INVENTOR(S) : Kikuzo TAKAMIYA; Yoshitaka TAMURA; Kiyofumi HIRAI It is certified that error appears in the above-identified patent and that said Letters Patent is hereby corrected as shown below:

On the title page item [30] change Foreign Application Priority Data to read as follows:

--Nov. 1, 1988 [JP]   Japan .............. 63-274570--.

Signed and Sealed this

Third Day of March, 1992

Attest:

HARRY F. MANBECK, JR.

Attesting Officer

Commissioner of Patents and Trademarks